UNITED STATES PATENT OFFICE.

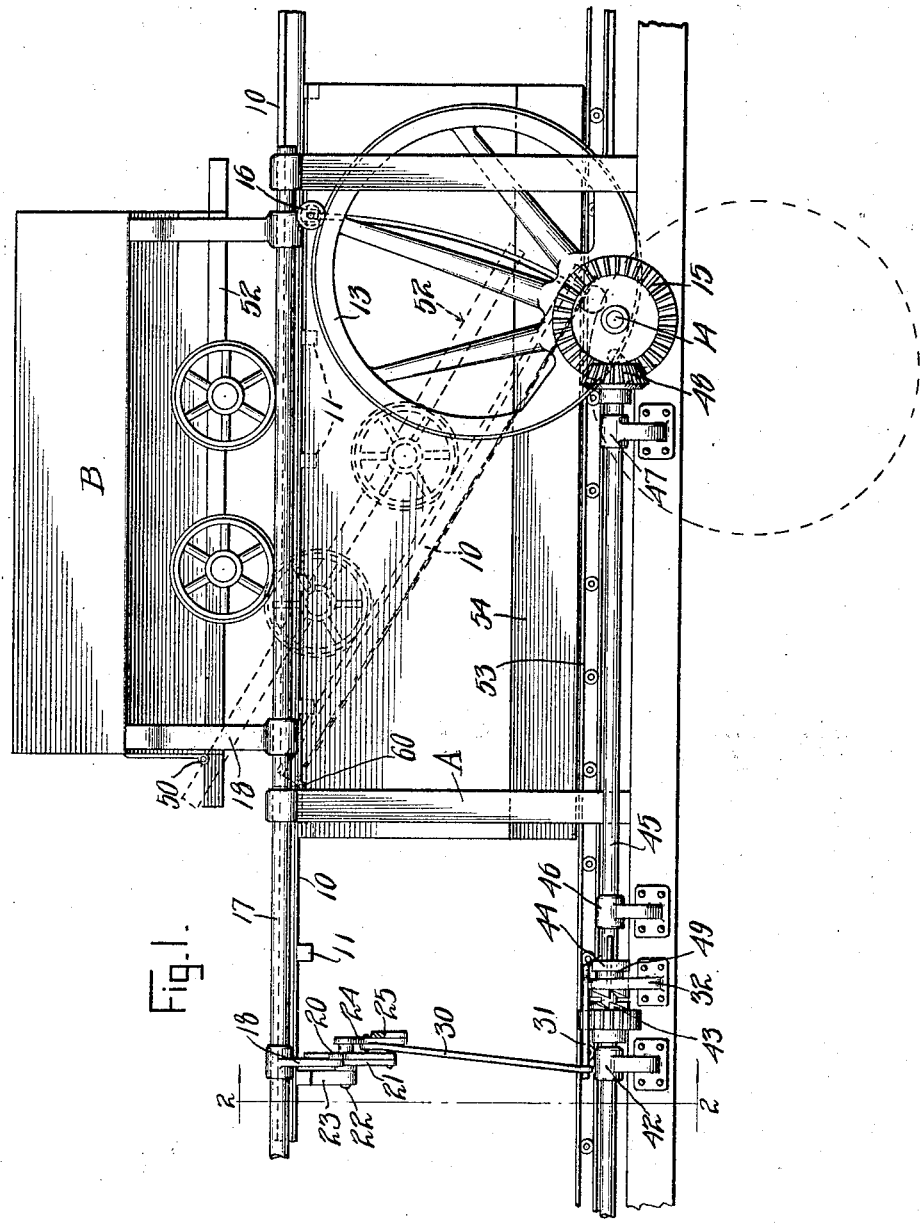

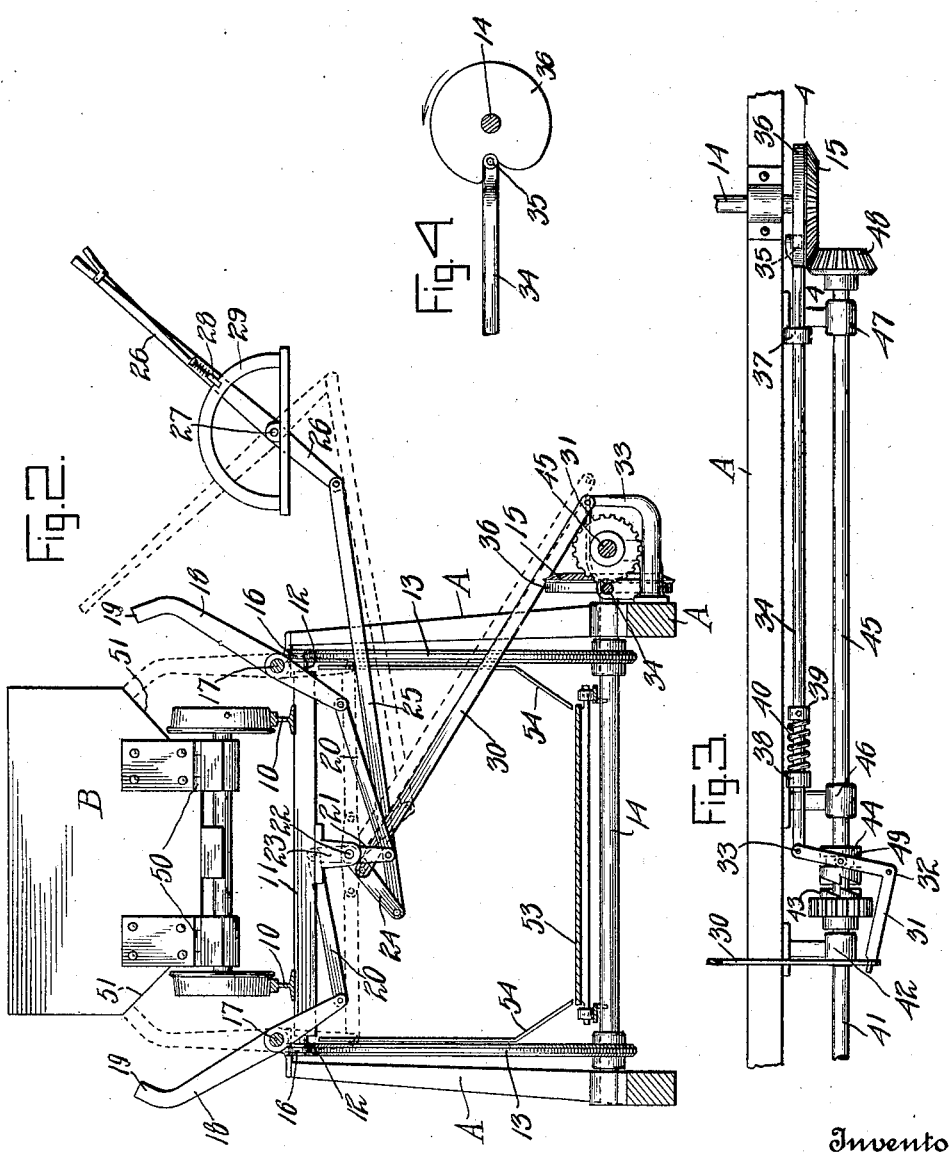

WILLIAM B. REYNOLDS, OF ROUNDUP, MONTANA.

DUMP-CAR.

1,327,255.   Specification of Letters Patent.   Patented Jan. 6, 1920.

Application filed May 16, 1919. Serial No. 297,617.

*To all whom it may concern:*

Be it known that I, WILLIAM B. REYNOLDS, a citizen of the United States, residing at Roundup, in the county of Musselshell and State of Montana, have invented certain new and useful Improvements in Dump-Cars, of which the following is a specification.

My invention relates to dumps and dump cars of the type especially designed for use in hauling coal from a mine and dumping it onto a conveyer leading to the shaker screen, or wherever else it may be desired. The purpose of said invention is to provide such a dump which will be simple in construction and efficient in operation and one wherein the structure of the car, when in dumping position, will perform the functions of a chute by which the substance in said car is directed to the conveyer or screen beneath the car and thus avoid the strain and damage resulting from an abrupt drop of the coal from the car onto said parts, or other place, all as will hereinafter be more fully described and claimed.

Referring to the accompanying drawings which are made a part hereof, and on which similar reference characters indicate similar parts, Figure 1 is a side elevation of a dump and car constructed in accordance with my said invention.

Fig. 2, a cross section of the same, showing the car in end elevation.

Fig. 3, a detail plan view of a portion of the operating mechanism, and

Fig. 4, a detail view looking in the direction indicated by the arrows from the dotted line 4—4 in Fig. 3.

In said drawings the portions marked A represent the frame or trestle on which the dump is constructed, and B the main body of the car.

The trestle work A and car B are in the main of usual or any appropriate structure and require no special description.

The rails 10 at the dumping section are connected by the cross frame members 11, and one end of each rail is connected by a hinge 60 to the main part of the rail and the other end is supported on cam wheels 13 mounted on a shaft 14 having a beveled gear wheel 15 on one end. The front end of the dumping platform has anti-friction rollers 16 mounted on journals 12 on its under side adapted to run on the peripheries of said cam wheels. Said rollers 16 are preferably convex or hollowed out and the periphery of the cams 13 are rounded or V-shaped in order to insure and maintain their bearing connection.

Rock shafts 17 are mounted on the frame A parallel with the tracks 10 and carry supporting arms 18 with inturned upper ends 19. The lower ends of said arms 18 are connected by links 20 to the opposite ends respectively of a double ended lever 21 mounted on a pivot 22 in a bracket 23 supported by one of the cross members 11 of the frame A. Said pivot 22 is connected by a crank arm 24 and a link 25 in the lower end of an operating lever 26 mounted on a pivot 27 provided with a pawl 28 engaging with a segment 29, as shown. Crank arm 24 is also connected by a link 30 with an angle lever 31 mounted on a pivot 32 on a bracket 33 supported by the frame A. The other end of said angle lever is pivoted at 32 to one end of a rod 34, the other end of which is provided with an anti-friction roller 35 adapted to bear against the edge of a cam wheel 36 mounted on shaft 14 just back of gear wheel 15. Said rod 34 is mounted to reciprocate through apertures in brackets 37 and 38 and has a collar 39 adjustably secured thereon, between which and said collar 39 a coiled spring 40 is mounted. Said spring 40 normally tends to hold the roller 35 against the edge of said cam 36.

The driving shaft 41 connected with power mechanism (not shown) is supported on appropriate bearings 42 on frame A and has a clutch part 43 fixed thereon. Another clutch part 44 is mounted to slide on a shaft 45 journaled in bearings 46 and 47 in line with shaft 41. Said shaft 45 has a gear adapted to mesh with the gear 15. Said clutch part 44 is connected to the angle lever 31 by a shoe pivoted thereon at 49 and adapted to run in a circumferential groove in said clutch part.

By this means, as will be readily seen, the shifting of lever 26 from the position shown by whole lines in Fig. 2 to the position shown in dotted lines, operates first to bring the supporting arms 19, at each end and on opposite sides of the car, in position under the inclined lower edges of the car to support the body when the dumping section of the track is lowered. At the same time, through the connection between the crank arm 24 and angle lever 31, clutch part 44 is drawn back on shaft 45 into engagement with the clutch part 43 on the driving shaft 41, thus operating to rotate shaft 14 and turn the cam wheels 13 thereon to permit the dumping section of the track to fall at its forward end. The bottom portion of the car, including the bottom and trucks constituting said bottom portion, are hinged to the body part at the rear end by hinges 50 and as the cam wheels 13 begin to turn, the forward end of the bottom structure of the car begins to fall supported at its rear end by the hinges 60. The inclined sides 51 of the bottom portion of the car serve as a chute to direct the coal in the car toward the center while the bottom or floor of the car 52 also acts as an inclined slide to direct the coal in its discharge onto the conveyer 53, or the screen, or any other receptacle provided therefor.

During the turning of shaft 14 carrying with it cams 13 the edge of the cam 36 bears against the anti-friction roller 35 holding rod 34 in position to maintain the clutch parts 43 and 44 in engagement. The first half of the rotation operates to lower the bottom of the car and dump the coal while the second half of the rotation carries it back to elevated position. When the cams 13 reach the position shown by whole lines in Fig. 1, cam 36 is turned so that anti-friction roller 35 falls into the notch in the side of the cams 36, permitting spring 38 to separate the clutch parts 43 and 44 and thus stop the further movement of said cams and also lock cams 13 from turning, thus supporting the hinged dumping section.

Deflecting sides 54 are preferably provided for directing and holding the coal onto conveyer 53, as usual.

It will be understood, of course, that while I have illustrated and described but one dumping section that similar dumping sections may be multiplied one after another as required, as many sections being provided as may be desired to accommodate the capacity of the dump and the number of cars used.

Having thus fully described my said invention, what I claim as new and desire to secure by Letters Patent, is:

1. A dump comprising a track having a hinged section, a car on said track and provided with a bottom hinged at one end, means for raising and lowering the other end of said track section, and means for supporting the body of the car while its bottom is lowered, substantially as set forth.

2. A dump comprising a track section hinged at one end, a car adapted to run on said track section and constructed with its body portion and its truck portion hinged together at the rear end, means for supporting the front end of the body portion when the front end of the truck portion is lowered, and means for raising and lowering the front end of said truck portion, substantially as set forth.

3. A dump comprising a track section hinged at one end, cam wheels mounted under the front end of said section for supporting raising and lowering the same, means for turning said cam wheels, a car adapted to run on said track section and constructed with its body portion and truck portion hinged together at its rear end, supporting arms pivoted along said pivoted track sections, means for throwing said pivoted arms into position to support the body of the car and at the same time throw into gear the means for operating the supporting cam wheels of the track section, substantially as set forth.

4. A dump comprising a hinged track section, a car with a hinged bottom, means for supporting the car body, and means for raising and lowering said bottom, substantially as set forth.

5. A dump comprising a hinged track section, means for supporting, raising and lowering said track section, a car body to run on said track section, said car being formed with a hinged bottom supported by the trucks mounted on said track section, substantially as set forth.

6. A dump comprising a track having a section hinged at one end, means for supporting, raising and lowering the other end of said section, a car mounted thereon having a bottom hinged at one end of the body, means for supporting the body, means for simultaneously throwing the body supports into operative position and coupling the gear for operating the lowering and raising mechanism for the track section, and means for automatically uncoupling said gear when the operation has been concluded, substantially as set forth.

7. A dumping mechanism comprising a track having a section hinged at one end, cam wheels supporting the opposite ends of said section rigidly mounted on a shaft, gear connected with said shaft for operating the same, clutch mechanism for coupling and uncoupling said gear, a cam for holding said gear in engagement, means for normally holding said gear out of engagement, means for supporting the car body, and means for simultaneously throwing said car body supporting means into operative position and closing the clutch for connecting the operating gear, substantially as set forth.

In witness whereof, I have hereunto set my hand and seal at Roundup, Montana, this 12th day of May, A. D. nineteen hundred and nineteen.

WILLIAM B. REYNOLDS. [L. S.]

Witnesses:
 R. L. DICK,
 JOHN R. BOWMAN.